US011469968B2

(12) United States Patent
Haddad et al.

(10) Patent No.: US 11,469,968 B2
(45) Date of Patent: Oct. 11, 2022

(54) AUTOMATED CLASSIFICATION OF NETWORK DEVICES TO PROTECTION GROUPS

(71) Applicant: Arbor Networks, Inc., Westford, MA (US)

(72) Inventors: Justin William Haddad, Merrimack, NH (US); Sean O'Hara, Ypsilanti, MI (US)

(73) Assignee: Arbor Networks, Inc., Westford, MA (US)

( * ) Notice: Subject to any disclaimer, the term of this patent is extended or adjusted under 35 U.S.C. 154(b) by 144 days.

(21) Appl. No.: 16/926,358

(22) Filed: Jul. 10, 2020

(65) Prior Publication Data

US 2021/0314233 A1 Oct. 7, 2021

Related U.S. Application Data

(60) Provisional application No. 63/006,297, filed on Apr. 7, 2020.

(51) Int. Cl.
*H04L 41/142* (2022.01)
*H04L 9/40* (2022.01)
*H04L 47/2441* (2022.01)
*G06N 7/00* (2006.01)
*G06N 20/00* (2019.01)
*G06K 9/62* (2022.01)

(52) U.S. Cl.
CPC .......... *H04L 41/142* (2013.01); *G06K 9/6256* (2013.01); *G06N 7/005* (2013.01); *G06N 20/00* (2019.01); *H04L 47/2441* (2013.01); *H04L 63/0236* (2013.01); *H04L 63/104* (2013.01); *H04L 63/105* (2013.01); *H04L 63/306* (2013.01)

(58) Field of Classification Search
None
See application file for complete search history.

(56) References Cited

U.S. PATENT DOCUMENTS 9,386,033 B1 * 7/2016 Rossman ................ H04L 63/20
10,652,283 B1 * 5/2020 Harvey ............... G06F 9/45558
(Continued)

*Primary Examiner* — Scott B Christensen
(74) *Attorney, Agent, or Firm* — Locke Lord LLP; Scott D. Wofsy; Christopher J. Capelli

(57) ABSTRACT

A method and system for automatically classifying protected devices of a protected network to protection groups providing customized protection. The method includes accessing network flow information that includes network statistics processed from observed data obtained by packet interception devices, accessing at least one model that was trained using machine learning and a training data set of the network flow information to classify protected devices having addresses that correspond to destination addresses associated with the training data set to respective protection groups as a function of the network statistics that correspond to the training data set, and classifying a protected device that has an address that corresponds to a destination address associated with a portion of the network flow information to at least one of the protection groups using the at least one model and machine learning and as a function of the network statistics that correspond to the portion of the network flow information.

20 Claims, 4 Drawing Sheets

(56) References Cited

U.S. PATENT DOCUMENTS

| | | | |
|---|---|---|---|
| 2010/0162383 A1* | 6/2010 | Linden | G06F 15/177 |
| | | | 726/13 |
| 2013/0219035 A1* | 8/2013 | Detienne | H04L 63/065 |
| | | | 709/223 |
| 2018/0004972 A1* | 1/2018 | Ruggiero | G06F 21/60 |
| 2018/0139240 A1* | 5/2018 | Voit | H04L 63/1433 |
| 2018/0218926 A1* | 8/2018 | Stuckey | H01L 21/67109 |
| 2019/0171966 A1* | 6/2019 | Rangasamy | G06N 20/00 |
| 2019/0268270 A1* | 8/2019 | Fattah | H04L 47/215 |
| 2021/0194931 A1* | 6/2021 | Parashar | H04L 63/104 |

* cited by examiner

AUTOMATED CLASSIFICATION OF NETWORK DEVICES TO PROTECTION GROUPS

CROSS REFERENCE TO RELATED APPLICATIONS

This application claims priority to U.S. Patent Application Ser. No. 63/006,297 filed Apr. 7, 2020, which is incorporated herein by reference in its entirety.

FIELD OF THE DISCLOSURE

The disclosed embodiments generally relate to computer network protection, and more particularly, to a system and method for automated classification of network devices to protection groups.

BACKGROUND OF THE DISCLOSURE

A network monitoring system can customize protection settings it uses for monitoring a protection group to provide optimal protection for the protection group. The protection group is a group of protected devices that have similar protection needs. The protection settings are set to most effectively and efficiently detect malicious traffic, avoid false alerts about attacks, and avoid categorizing legitimate network traffic as malicious (which could result in dropping legitimate network traffic). The network monitoring system may have the capability of applying customized protection settings to tens or hundreds of protection groups, allowing for a high level of granularity with which to divide the protected devices into protection groups.

Once the protection groups are created, administrators of monitoring systems for protected networks can find it time consuming and tedious to assign protected devices to a large selection of protection groups. Rather, administrators may avoid the tediousness of this task by only creating a small number or protection groups so that the respective protected devices can only be assigned to protection groups selected from a small selection of available protection groups, without taking advantage of the granularity of customized protection settings available. Furthermore, once a protected device is assigned to a protection group, even though network configuration and behavior may change over time or in time-related patterns, the assignments may not be updated.

Such suboptimal effectiveness of assignments of protected devices to protection group configurations can result in reduced effectiveness and efficiency in protecting the protected devices. Effectiveness and efficiency can decline as the network configuration and/or behavior changes over time or in cyclical patterns. Practically, the result can include excessive false positive alerts and dropping of legitimate network traffic.

Conventional methods and systems for providing customized protection groups have generally been considered satisfactory for their intended purpose. However, there is still a need in the art to take advantage of the granularity of protection settings available via customized protection groups when assigning protected devices to protection groups and as network behavior and configuration evolves.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of automatically classifying protected devices included in a protected network to a plurality of protection groups, each protection group providing customized protection. The method includes accessing network flow information, the network flow information including network statistics processed from observed data obtained by packet interception devices configured to intercept packets of network traffic. The method further includes accessing at least one model, wherein the at least one model was trained using machine learning and a training data set of the network flow information, the at least one model being trained to classify protected devices having addresses that correspond to destination addresses associated with the training data set to respective protection groups of the plurality of protection groups as a function of the network statistics that correspond to the training data set. The method further includes classifying a protected device to at least one protection group of the plurality of protection groups, the protected device having an address that corresponds to a destination address associated with a portion of the network flow information, wherein the protected device is classified to the at least one protection group using the at least one model and machine learning and as a function of the network statistics that correspond to the portion of the network flow information.

In one or more embodiments, the method can further include outputting results of the classification of the protected device to the at least one protection group together with identification and/or parameters of the at least one model used for the classification.

In one or more embodiments, the protection group to which the protected device is classified includes several protection groups and the method can further include determining a probability score for each protection group of the several protection groups, wherein the probability score is a function of at least one of a number of models of the least one model used for the classification, parameters of the at least one model used for the classification, a number of times the protected device was classified or assigned to the protection group. The method can further include outputting results of the classification of the protected device to each of the several protection groups together with the probability score determined for each protection group of the several protection groups.

In one or more embodiments, the method can further include ignoring network flow information having corresponding destination addresses of protection devices that were previously classified to a protection group and the classifications were verified.

In one or more embodiments, the method can further include intercepting packets of the network traffic, aggregating network flows from the intercepted packets, and forming network flow information from the aggregated network flow, wherein a network flow is a series of bounded communications between a source address and a destination address associated with one of the protected devices.

In one or more embodiments, the network flow information can further include test network flow information having corresponding destination addresses of protection devices that were previously classified to a protection group and one of the classifications was verified for each of the protection devices by assigning the protection group to the protection group. The method can further include testing the at least one model, including comparing the protection group to which the protected device was classified with the protection group to which the protected device was previously assigned and associating a test score with the respective at least one model as a function of performance of the model as indicated by comparison, wherein the parameters of the at least one model include the test score associated with the respective models.

In one or more embodiments, the method can further include training the at least one model using machine learning and the training data set, including training the at least one model to classify the protected devices having addresses that correspond to the destination addresses associated with the training data set to the respective protection groups of the plurality of protection groups as a function of the network statistics that correspond to the training data set.

In one or more embodiments, the method can further include receiving user feedback regarding one of the at least one protection group to which one of the protected devices was classified and assigning the protected device to the protection group based on the user feedback.

In one or more embodiments, the method can further include prompting a user for the user feedback.

In one or more embodiments, the method can further include determining augmented data for the protected device, wherein the augmented data can include at least one of a traceroute tree, hop numbers to the destination address, and ping latency, wherein the network flow information used for the classification of the protected device further includes the augmented data.

In aspects of the disclosure, a computer system and computer-readable medium are provided that implement the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
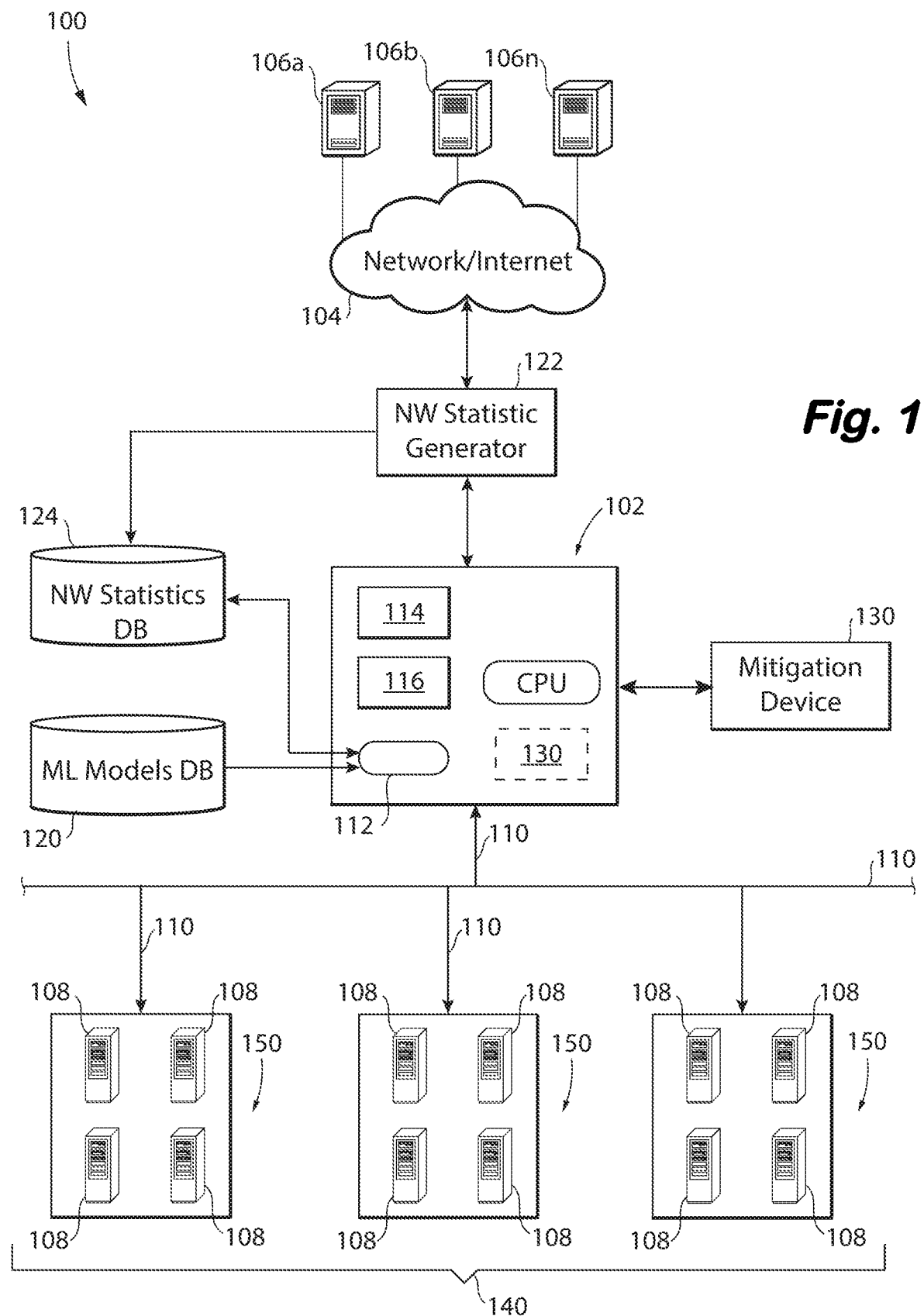
FIG. 1 illustrates a block diagram of an example network system having a protected network to which automatic protection group classification is applied, in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-5, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network system 100 is provided, wherein network system 100 includes a protected network 140 that can facilitate internal communication within the protected network 140 and/or can communicate with external computing systems (e.g., 106a-106n) via an external network 104.

The protected network 140 includes a network protection system 102 that protects one or more protected devices 108. The network protection system 102 can communicate with the external network 104 via one or more wired and/or wireless external communication links. Additionally, the network protection system 102 can communicate with the protected devices 108 via one or more wired and/or wireless internal communication links. Communications among the protected devices 108 and between the protected devices 108 and the external network 104 are monitored by the network protection system 102.

Network protection system 102 enables automatic classification of protected devices 108 for automatic assignment to protection groups 150 based on observed characteristics of network behavior over time. Protected devices 108 are assigned to protection groups 150 in order that network usage of protected devices 108 belonging to the same protection group 150 have a higher degree of similarity than network usage of protected devices 108 assigned to other protection groups 150. Classification assignments of protected devices 108 to protection groups 150 can be performed automatically in real time during network operation, or classifications can be submitted to users for confirmation or feedback before performing the actual assignment. Administrators of the protected network 140 can be provided with a user interface that enables the administrator to receive classification suggestions of automated assignments of protection devices 108 to protection groups 150, confirm, reject, or select from multiple suggestions, all in real time, even as configuration of the protected network or traffic patterns change.

Network protection system 102 applies statistics about network flows of network traffic to protected devices 108 to machine learning (ML) models for performing the automatic classification process. A network flow is defined as a summary of bounded communications between two or more endpoints, wherein one of the endpoints is a destination having a destination address. The ML models are trained using machine learning applied to the network traffic statistics over time. Once trained, the ML models are deployed to monitor network flows of real time network traffic for updating classifications and continuous refinement of the ML models based on administrator feedback. The ML models can self-adapt to changes in network traffic over time to account for the cyclic nature of network usage and evolving customer networks.

Network monitoring system 102 has a capability of allowing many protection groups 150 to be configured so that each protection group can have fine-tuned protection parameters, e.g., for identifying malicious traffic. The automated assignment to protection groups 150 overcomes the risk of under-utilization that can affect manual systems having fine-tuning capabilities. One reason that under-utilization can arise is that manual performance of the task is cumbersome and tedious. Another reason for under-utilization is the lack of coordination between actual real-time conditions and assignments to protection groups 150. When performed manually, an administrator can only estimate real time conditions based on whatever knowledge is available. As network conditions or configurations change, an administrator would be unaware that a protection group assignment 150 is no longer optimal, and effectiveness of the assignments of protected devices 108 to protection groups 150 is bound to deteriorate.

By automating suggested or actual protection group assignments for protected devices, protection from DDoS attacks becomes finely tuned to the needs of the particular protected devices 108 based on the actual, real time network behavior. Furthermore, administrators can merely accept or reject protection group assignment suggestions, including updates to the protection group assignments, without being bogged down with determining initial assignments or when to modify assignments. By fine tuning assignments to protection groups, dropping of legitimate traffic by threat detection or mitigation systems can be reduced or minimized. Even as network conditions and configurations change, the protection group assignments can be automatically updated.

Protected devices 108 are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics). The protected devices 108 can communicate via the protected network 140 with one another or with the external network 104.

The protected network 140 and external network 104 can include one or more networks, such as an intranet, a local area network (LAN), and/or a wide area network (WAN). In examples, the protected network 140 can be an enterprise network, such as a school network, business network, and government network, to list a few examples, that can connect to the Internet. The external network 104 is external to protected network 140 and can be included in the Internet.

Central or distributed intercept components 110 are configured to actively or passively intercept network traffic to protected devices 108. Intercept components 110 can include software, firmware, and/or hardware components, such as taps, probes, or port mirrors. These elements can be positioned inline, and/or remote relative to communication links 120. Network statistics generator 122 can receive intercepted network traffic in real time from intercept components 110. The term "receive," as used in this context refers to accessing, receiving a transmission, retrieving, reading, or otherwise obtaining.

In the data ingestion phase, processing of the network traffic (such as aggregation and sorting of packets of the network traffic into network flows or determining characteristics of the network flows) can be performed by intercept components 110 and/or network statistics generator 122. Intercept components 110 can provide the network traffic data to network statistics generator 122 as raw data or as network flows, or as network flows with supplemental data about characteristics of the network flows. The supplemental data can include network flow information (NFI) about the network traffic aggregated into network flows, such as protocol, port, and statistical flow information (SFI) per network flow. SFI for a network flow can include, for example throughput and latency. Selected NFI for each network flow can be stored in network statistics database 124.

With regards to protection of protected network 140, in embodiments, at least portions of the network protection system 102 are located between the external network 104 and the protected network 140. In other embodiments, at least portions of the network protection system 102 are located within the external network 104 or protected network 140. At least portions of the network protection system 102 can be located at a network edge (inside or outside of the protected network 140) or deeper within the protected network 140.

The network protection system 102 includes or communicates with a protection group classification component 112, a monitor component 114, a user interface component 116, a machine learning (ML) models database (DB) 120, the network (NW) statistics generator 122, the network statistics database 124, and optionally a mitigation device (MD) 130. In one or more embodiment, the network protection system 102 can be configured as a firewall or a router.

Each of protection group classification component 112, a monitor component 114, a user interface component 116, network statistics generator 122, and mitigation device 130 can be configured as individual processing devices or can be fully or partially integrated with one another, wherein integration includes sharing one or more hardware and/or software components. Machine learning models database 120 and network statistics database 124 can be configured as individual long term storage devices or can be fully or partially integrated with one another.

Monitor component 114 monitors network traffic directed to protected devices 108. The monitoring performed is customized to the protection group 150 to which the destination protected device 108 belongs. In an example scenario, tens or more than a hundred protection groups can be accommodated, each with different protection settings that determine the type of monitoring that is performed for the member protected devices 108 of the protection group 150. Some examples of customized protection settings include rate based blocking thresholds, payload pattern matching settings, TCP connection limiting settings, TCP connection authentication settings, DNS rate limiting settings, DNS request pattern matching settings, and HTTP rate limiting settings.

Accordingly, each protection group 150 can have protection settings that are optimal for the protection group to most effectively and efficiently detect malicious traffic, avoid false alerts about attacks, and avoid categorizing legitimate network traffic as malicious (which could result in dropping legitimate network traffic).

The user interface component 116 communicates with user input and output devices, such as via a graphical user interface (GUI) by which a user can input selections and receive output, such as alerts, requests for user feedback, and data (e.g., depicted graphically, textually, or pictorially). The user interface component 116 communicates with other components of protection group classification component 112 to provide data input by users or output data from the components to the users.

The user interface component 116 can provide a GUI that enables a user to create protection groups 150, view assignment of protected hosts 108 to the protection groups 150, receive and respond to requests for feedback regarding classification of the protected hosts 108 for assignment to the protection groups 150.

MD 130 may apply mitigation countermeasures to network traffic determined by monitor component 114 to be malicious. Mitigation countermeasures can include, for example, blocking traffic, redirecting the traffic to a selected destination (such as a scrubbing device), and/or blacklisting the source (e.g., an IP address of the source) of the suspicious traffic. Blocked traffic is not allowed to be transmitted to its intended destination (e.g., a destination IP address indicated in the traffic). When the source of the suspicious traffic is blacklisted, future traffic from the same source IP address may be blocked.

The network protection system 102, ML models database 120, a network statistics generator 122, network statistics database 124, and MD 130 can be implemented as one or more physical or virtual devices. The ML models database 120, a network statistics generator 122, network statistics database 124, and MD 130 can be included within the network protection system 102 or can be computing systems separate from, but in communication with, the network protection system 102. Whether implemented as physical or virtual device(s), the network protection system 102, ML models database 120, a network statistics generator 122, network statistics database 124, and MD 130 use a local or remote processing device having hardware or firmware that executes software instructions, which enables performance of the disclosed functions. Additionally, the network protection system 102, ML models database 120, a network statistics generator 122, network statistics database 124, and MD 130 can share one or more hardware, firmware, and/or software components.

Following a data ingestion phase in which network traffic is intercepted and network flows are aggregated, a data preparation phase is implemented. In the data preparation phase, protection group classification component 112 prepares the NFI for training one or more ML models, validating the ML models, and testing the ML models. Protection group classification component 112 is configured to access NFI, including SFI, associated with respective network flows stored in network statistics database 124. For the purposes of training, validating, and testing, preparation of the NFI can include filtering the NFI to eliminate data for flows that are not assigned to a protection group 150. Preparation can further include normalizing the NFI and partitioning the NFI into different sets.

The sets can include, for example, a training NFI set to be used for training the ML models, a validation NFI set to be used for validating the ML models, and a testing NFI set to be used for testing the ML models. The training, testing, and validation NFI sets do not overlap with respect to the destination address for each network flow associated with the NFI.

In one or more embodiments, the NFI can be augmented, such as to include a traceroute tree for the network flows. Further, the SFI can be augmented, such as to include a number of hops to the destination and/or ping latency, per network flow. The NFI, SFI and augmented NFI and SFI are analyzed during the ML model training in an attempt to form algorithms that will be able to predict the most suitable protection group 150 as a function of the NFI, SFI, augmented NFI and augmented SFI per destination protected device 108.

With regards to training the ML models during a training phase, several ML models can be trained by fitting each ML model to the training NFI and known assignments for each network flow. Examples of ML models to be trained include kNN, Random Forest, Neural Network, Stacks, etc. Each ML model is trained using machine learning to classify destination of network flows of the accessed network traffic into their pre-assigned protection groups as a function of the network statistics provided in the SFI. In one example that demonstrates how certain statistics are considered during model training, when statistics associated with a destination indicate that the destination is transmitting a high volume of network traffic, having a common set of destination ports, and receiving traffic for a specific IP protocol, that destination is classified as a web server and is assigned to a protection group 150 with protection settings fine-tuned for a web server. With regards to validating the ML models during a validation phase, the validation NFI set are applied to the trained ML models. The destination addresses for protected devices associated with the NFI in the validation NFI set correspond to known protection groups. The performance of the ML models is based on whether the respective ML models classify the protected devices having the destination addresses associated the NFI to the correct protection groups. ML models that perform below a performance threshold are filtered out as underperforming. The remaining ML models are validated. Additionally, ML model input parameters can be tuned during the validation phase for increasing optimal performance.

The validated ML models are deployed and tested during a testing phase using the testing NFI set. The testing NFI set is applied to the validated ML models. The destination addresses for protected devices associated with the NFI in the testing NFI set correspond to known protection groups. The performance of the ML models is based on whether the respective ML models classified the protected devices having the destination addresses associated the NFI to the correct protection groups. A test score is assigned to each of the ML models based on the ML model's performance making accurate classifications. ML models that perform below a performance threshold are filtered out as underperforming and are not used for further deployment. The remaining ML models are used for real time deployment.

During a real time deployment phase, as network flows are received in real time by network statistics generator 122, corresponding NFI data is received by protection group classification component 112 and applied to the deployed ML models. NFI for network flows having a destination address of a protection device that is not yet classified to a protection group are processed by protection group classification component 112, as there is no need to process NFI for network flows having a destination address of a protection device already classified during the training phase. The NFI for the network flows are normalized. In one or more embodiments, protection group classification component 112 determines and normalizes augmented NFI and/or SFI and includes these with the NFI. Protection group classification component 112 classifies the protection device 108 that corresponds to the destination address of each network flow associated with the NFI to a protection group by applying the NFI to the ML models. This application of NFI to the ML models includes application of the SFI to the ML models for determining the classification based on the SFI.

Protection group classification component 112 outputs as classification metadata a classification for the protected device with an associated probability. Since each ML model can generate a classification, protection group classification component 112 determines the probability of a recommended classification based on the classification output of the different ML models used. The probability of the recommended classification is based on how many of the ML models produced that classification and test scores associated with those ML models. If all of the ML models used are in consensus for the same classification, the probability for the recommended classification is increased. Similarly, if the ML models were not in consensus, the probability for the recommended classification can be decreased.

The classification metadata can include different classifications produced by different ML models. The classification metadata associated with each classification can further include the probability for the classification (which is based on how many of the ML models produced that classification and test scores associated with those ML models), and identification of the ML model(s) that produced the classification. In one or more embodiments, the classification metadata further includes the test score associated with each ML model that produced the classification. Protection group classification component 112 can further determine a probability score for each classification produced, wherein the probability score is a function of the number of ML models that produced the classification and the test scores associated with those ML models.

In a feedback phase, protection group classification component 112 determines whether auto-classification is enabled. If auto-classification is enable, protection group classification component 112 assigns the protection device 108 to a protection group 150 using the recommended classification.

If auto-classification is not enabled, the administrator is prompted for user feedback via user-interface component 116. Prompting can include sending a request or configuring the GUI to allow the administrator to provide the user feedback. The user feedback request can provide the administrator with the opportunity to accept or reject the recommended classification. In one or more embodiments, the user feedback request can include presentation of additional information in the classification metadata, such as each classification produced by the different ML models, identification of the ML models and their associated test scores. The probability score associated with each of these classifications can also be presented. The administrator can provide user feedback by selecting one of the classifications available.

The user feedback is applied by assigning the protected device to a protection group in accordance with the selected classification. Furthermore, the user feedback is processed by updating the ML models as a function of the administrator's classification selection. When user feedback accepts a classification (which includes selecting that classification), a confidence value associated with each ML model that made the selected classification can be incremented. Similarly, when user feedback rejects (which includes not selecting) a classification, a confidence value associated with the ML model that made the rejected classification can be decremented.

In one or more embodiments, the accepted classifications are likely to become part of the training data for subsequent iterations of the training phase. Previously used ML models can be re-trained with this feedback taken into consideration. Rejected classifications can also be remembered to avoid making the same classification in future deployments. By performing continuous iterations of the training phase, retraining occurs each time the training phase is performed. During retraining, ML models are trained by taking into account new assignments and rejected classifications from previous deployment and feedback phases.

Figure 2:
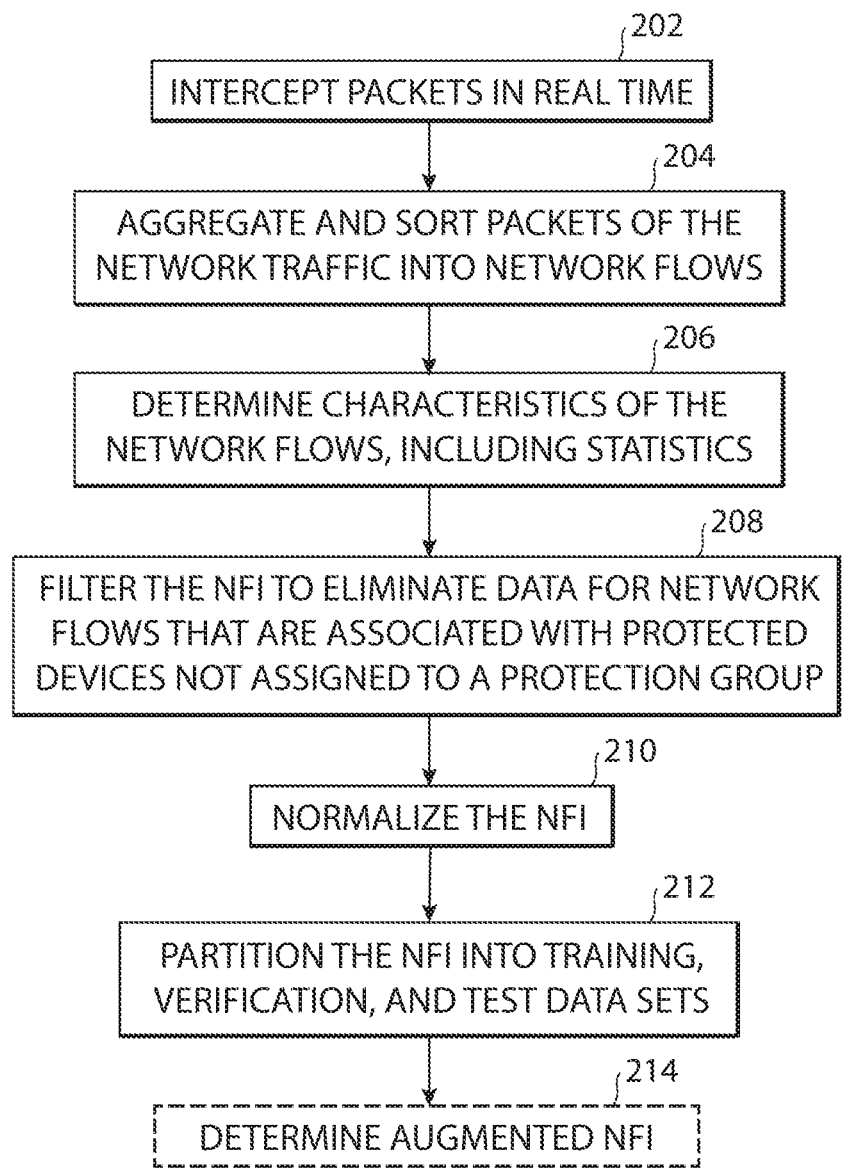
FIG. 2 is an example flowchart showing an example method performed during data ingestion and data preparation phases, in accordance with an aspect of the disclosure.
Figure 3:
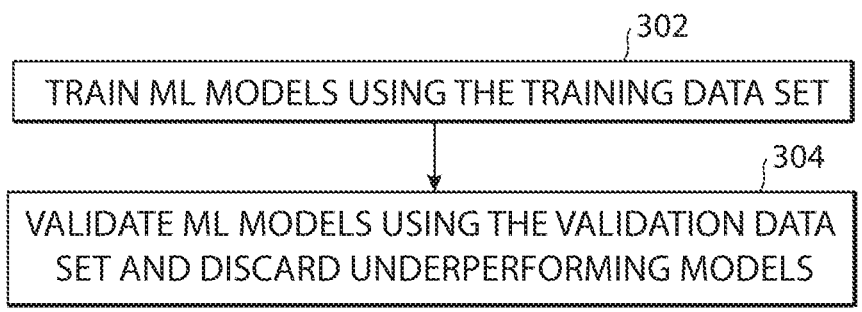
FIG. 3 is an example flowchart showing an example method performed during a training phase, in accordance with an aspect of the disclosure.
Figure 4:
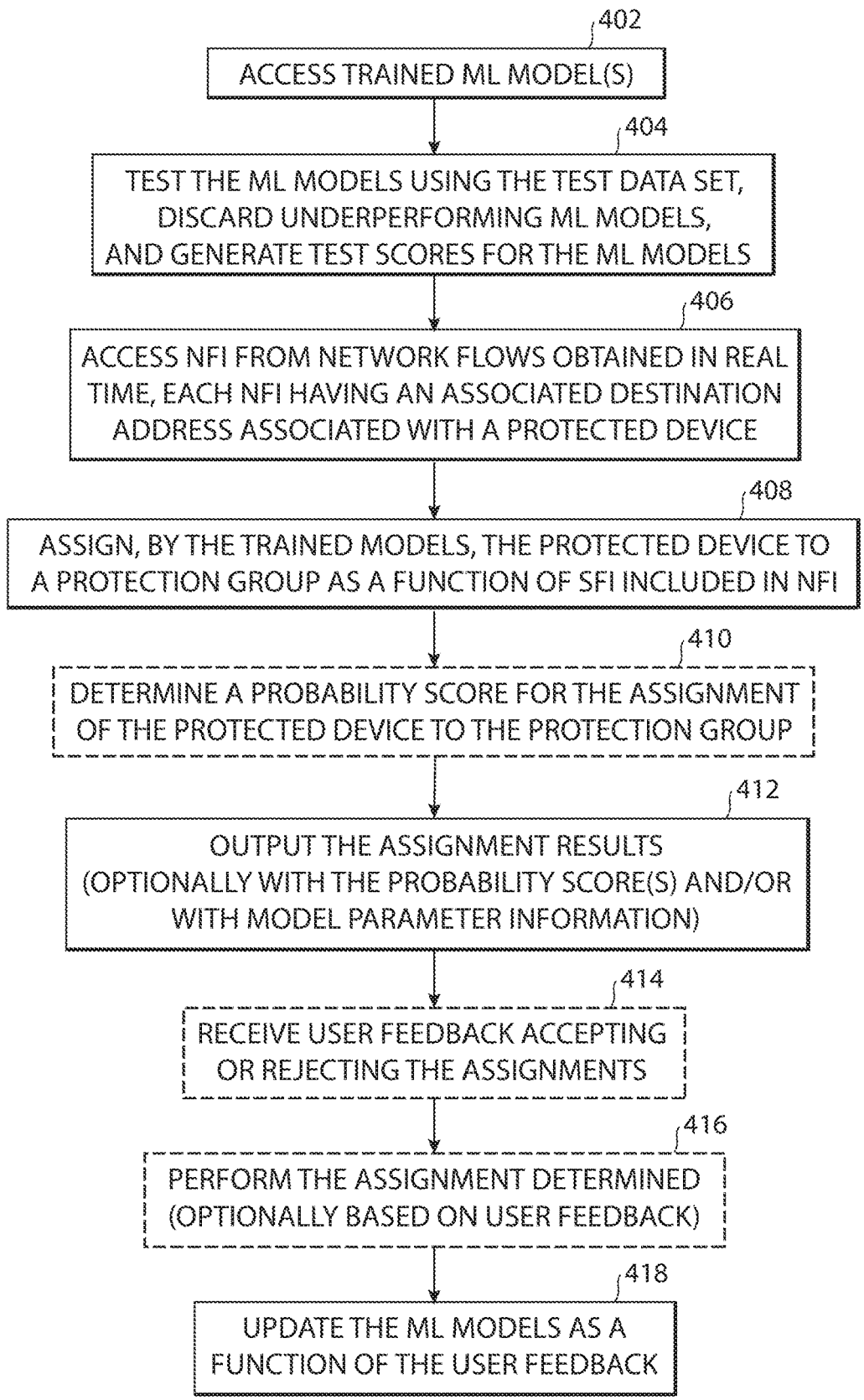
FIG. 4 is an example flowchart showing an example method performed during deployment and feedback phases, in accordance with an aspect of the disclosure.

Data profiling is continued as an ongoing process. The protection group profiling process is executed at the end of each feedback phase iteration for each protection group that had at least one classification accepted. With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order. Also certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of operations performed during the data ingestion and preparation phase, such as by data intercept components and/or a network statistic generator, e.g., data intercept components 110 and/or network statistic generator 122 shown in FIG. 1. At operation 202, network traffic is intercepted in real time. At operation 204, packets of packets of the network traffic are aggregated and sorted into network flows. At operation 206, characteristics of the network flows are determined. The characteristics can be stored as NFI, such as in statistics database 124 shown in FIG. 1. The characteristics include SFI that includes statistics about the network flows. The SFI can include, for example throughput and latency. The NFI can further identify protocols and ports used by the respective network flows.

The method continues during the data preparation phase. At operation 208, the NFI is filtered to eliminate NFI data associated with destination addresses of protected devices (such as protected devices 108 shown in FIG. 1) that are not classified to a protection group. At operation 210, the NFI is normalized. At operation 212, the NFI is partitioned into training, verification, and test data sets. In one or more embodiments, at operation 214, augmented NFI is determined. Operation 214 can be optional, as indicated by its dotted outline.

With reference to FIG. 3, a flowchart is shown of operations performed by a protection group classification component, such as protection group classification component 112 shown in FIG. 1, during the training phase. At operation 402, one or more ML models are trained using the training data set. The training is performed as a function of the NFI, including the SFI, in the training data set. If augmented data was determined at operation 308, the NFI and SFI can included augmented data. At operation 404, the ML models are validated using the validation data set and underperforming models are discarded.

With reference to FIG. 4, a flowchart is shown of operations performed by a protection group classification component, such as protection group classification component 112 shown in FIG. 1. The method begins during the deployment phase. At operation 402, the trained ML model(s) that were trained in FIG. 3 are accessed. At operation 404, the ML model(s) are tested using test data. Based on performance as determined by the testing, underperforming ML models are discarded. Test scores are generated for the ML models based on their performance as indicated by the testing.

At operation 406, NFI from network flows obtained in real time is accessed. NFI associated with each network flow has an associated destination address associated with a protected device, such as protected devices 408 shown in FIG. 1. At operation 408, the trained ML models classify the protected device identified in the NFI associated with the respective network flows, wherein each protected device 408 is classified to at least one protection group. The classification is made as a function of SFI included in the NFI.

In one or more embodiments, at operation 410, a probability score is determined for the classification of the protected device to the at least one protection group. Operation 410 can be optional, as indicated by its dotted outline. At operation 412, the classification results are output. In one or more embodiments, the classification results can include probability score(s) and/or model parameter information about the ML models that performed the assignments. The model parameter information can include identification of the respective ML models and test scores associated with the ML model. The model parameter information can include a description of the type of model and settings that were used for performing the assignment.

At operation 414, during a feedback phase, user feedback is received. Operation 414 can be optional, as indicated by its dotted outline. The user feedback can be received in response to a request or prompt, or the user feedback can be output based on initiation by an administrator without being requested or prompted. The user feedback can indicate whether the administrator accepts or rejects the classifications that were output. At operation 416, the assignment of the protection device to a protection group is performed. This assignment can be performed based on the classification determination output at operation 412 and/or based on user feedback received at operation 414. At operation 418, the ML models can be updated as a function of the user feedback. Operation 418 can be optional, as indicated by its dotted outline.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network protection system 102, network statistics generator 122, mitigation device 130, and/or protected devices 108 may be implemented or executed by one or more computer systems. For example, network statistics generator 122, mitigation device 130, and/or protected devices 108 can be implemented using a computer system such as example computer system 500 illustrated in FIG. 5. In various embodiments, computer system 500 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types. Computer system 500 may be practiced in distributed data processing environments where tasks are performed by remote processing devices that are linked through a communications network. In a distributed data processing environment, program modules may be located in both local and remote computer system storage media including memory storage devices.

Figure 5:
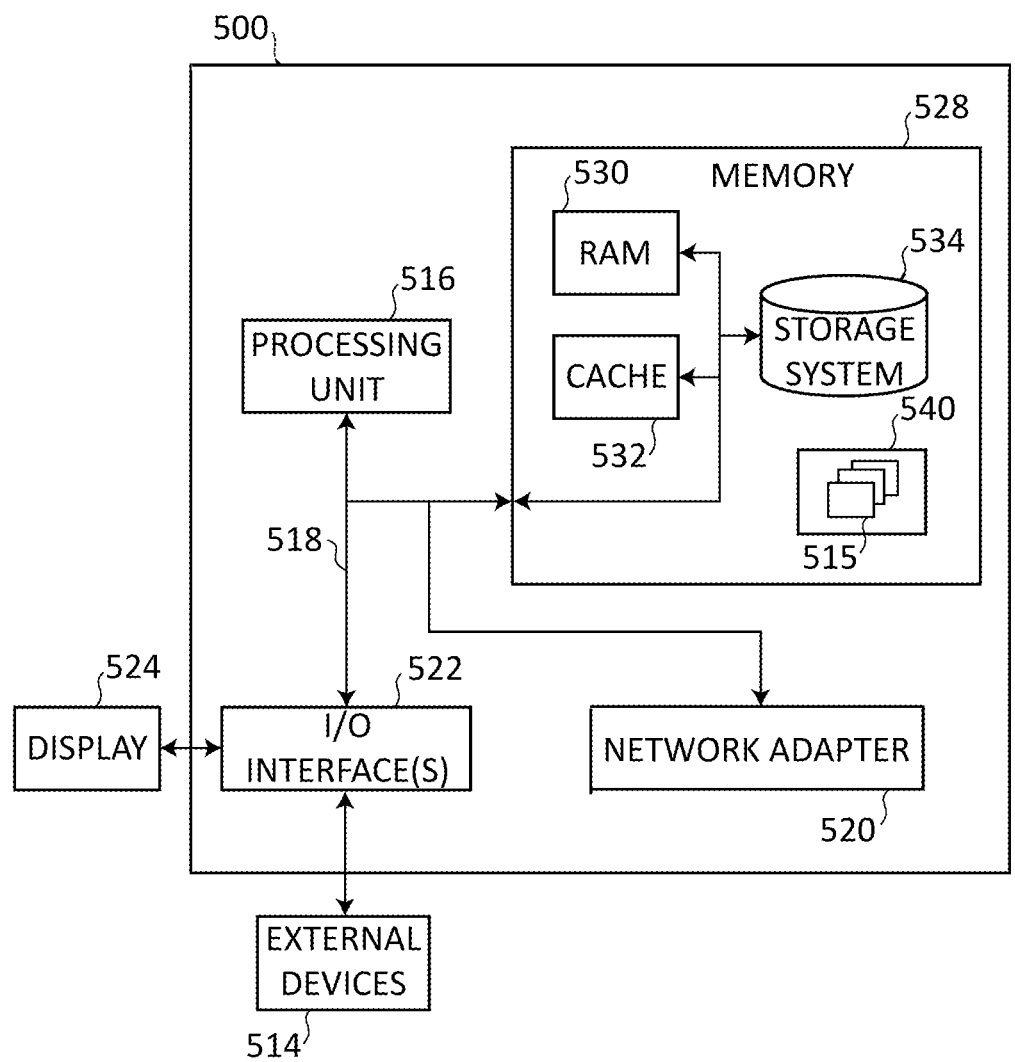
FIG. 5 illustrates an example computing system that could be used to implement the protected device or network protection system shown in FIG. 1.

Computer system 500 is shown in FIG. 5 in the form of a general-purpose computing device. The components of computer system 500 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 500 typically includes a variety of computer system readable media. Such media may be any available media that is accessible by computer system 500, and it includes both volatile and non-volatile media, removable and non-removable media.

System memory 528 can include computer system readable media in the form of volatile memory, such as random access memory (RAM) 530 and/or cache memory 532. Computer system 500 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as computer system 500, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 500 may also communicate with one or more external devices 514 such as a keyboard, a pointing device, a display 524, etc.; one or more devices that enable a user to interact with computer system 500; and/or any devices (e.g., network card, modem, etc.) that enable network statistics generator 122, mitigation device 130, and/or protected devices 108 to communicate with one or more other computing devices. Such communication can occur via Input/Output (I/O) interfaces 522. Still yet, computer system 500 can communicate with one or more networks such as a local area network (LAN), a general wide area network (WAN), and/or a public network (e.g., the Internet) via network adapter 520. As depicted, network adapter 520 communicates with the other components of network system 100 via bus 518. It should be understood that although not shown, other hardware and/or software components could be used in conjunction with computer system 500. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by automatic assignment of a protected device to a protected group, in addition to relieving administrators from tedious tasks, includes fine-tuned assignments based on actual, real time conditions, whereas manual assignments would be based on estimated conditions. Additionally, the assignments are updated automatically as network conditions or configurations change. The fine-tuning improves the accuracy and efficiency of network protection, reducing or minimizing false alerts and blocking of legitimate traffic.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method for automatically classifying protected devices included in a protected network to a plurality of protection groups, each protection group providing customized protection, the method comprising:
   accessing network flow information, the network flow information including network statistics processed from observed data obtained by packet interception devices configured to intercept packets of network traffic;
   accessing at least one model, wherein each model of the at least one model is a machine learning (ML) model, wherein the at least one model was trained using machine learning and a training data set of the network flow information, the at least one model being trained to classify protected devices having addresses that correspond to destination addresses associated with the training data set to respective protection groups of the plurality of protection groups as a function of the network statistics that correspond to the training data set,
   wherein the training data set of the network flow information is determined from the intercepted packets of network traffic determined to be associated with one or more devices previously assigned to the plurality of protection groups, and
   wherein a test score is assigned to each of the at least one models representing the ML model's performance in making accurate classifications of previously classified devices;
   responsive to each of the ML models of the at least one model being assigned a test score meeting a threshold, classifying a protected device to at least one protection group of the plurality of protection groups, the protected device having an address that corresponds to a destination address associated with a portion of the network flow information,
   wherein the protected device is classified to the at least one protection group using the at least one model and machine learning and as a function of the network statistics that correspond to the portion of the network flow information, and
   wherein the portion of the network flow information is associated with devices that were not previously assigned to the plurality of protection groups; and
   outputting results of the classification of the protected device to the at least one protection group together with identification and/or parameters of the at least one model used for the classification,
   wherein the parameters of the respective at least one model include the test score assigned to the corresponding ML model.

2. The method of claim 1, wherein the parameters of the respective at least one model further include a description of the type of model used for the corresponding ML model and/or settings that were used for performing the classification.

3. The method of claim 1, further comprising, wherein the protection group to which the protected device is classified includes several protection groups:
   determining a probability score for each protection group of the several protection groups, wherein the probability score is a function of at least one of a number of models of the least one model used for the classification, the parameters of the at least one model used for the classification, and a number of times the protected device was classified or assigned to the protection group; and
   outputting results of the classification of the protected device to each of the several protection groups together with the probability score determined for each protection group of the several protection groups.

4. The method of claim 3, wherein the network flow information further includes test network flow information having corresponding destination addresses of protection devices that were previously classified to a protection group and one of the classifications was verified for each of the protection devices by assigning the protection group to the protection group, the method further comprising:
   testing the at least one model, including comparing the protection group to which the protected device was classified with the protection group to which the protected device was previously assigned; and
   associating the test score with the respective at least one model as a function of performance of the model as indicated by comparison.

5. The method of claim 1, further comprising ignoring network flow information having corresponding destination addresses of protection devices that were previously classified to a protection group and the classifications were verified.

6. The method of claim 1, further comprising intercepting packets of the network traffic, aggregating network flows from the intercepted packets, and forming the network flow information from the aggregated network flow, wherein a network flow is a series of bounded communications between a source address and a destination address associated with one of the protected devices.

7. The method of claim 1, further comprising training the at least one model using machine learning and the training data set, including training the at least one model to classify the protected devices having addresses that correspond to the destination addresses associated with the training data set to the respective protection groups of the plurality of protection groups as a function of the network statistics that correspond to the training data set.

8. The method of claim 1, further comprising:
   receiving user feedback regarding one of the at least one protection group to which one of the protected devices was classified; and
   assigning the protected device to the protection group based on the user feedback.

9. The method of claim 8, further comprising prompting a user for the user feedback.

10. The method of claim 1, further comprising determining augmented data for the protected device, the augmented data including at least one of a traceroute tree, hop numbers to the destination address, and ping latency, wherein the network flow information used for the classification of the protected device further includes the augmented data.

11. A system of automatically classifying protected devices included in a protected network to a plurality of protection groups, each protection group providing customized protection, the system comprising:
   a memory configured to store a plurality of programmable instructions; and at least one processing device in communication with the memory, wherein the at least one processing device, upon execution of the plurality of programmable instructions is configured to:
  access network flow information, the network flow information including network statistics processed from observed data obtained by packet interception devices configured to intercept packets of network traffic;
  access at least one model, wherein each model of the at least one model is a machine learning (ML) model and the at least one model was trained using machine learning and a training data set of the network flow information, the at least one model being trained to classify protected devices having addresses that correspond to destination addresses associated with the training data set to respective protection groups of the plurality of protection groups as a function of the network statistics that correspond to the training data set,
    wherein the training data set of the network flow information is determined from the intercepted packets of network traffic determined to be associated with one or more devices previously assigned to the plurality of protection groups, and
    wherein a test score is assigned to each of the at least one models representing the ML model's performance in making accurate classifications of previously classified devices;
  responsive to each of the ML models of the at least one model being assigned a test score meeting a threshold, classify a protected device to at least one protection group of the plurality of protection groups, the protected device having an address that corresponds to a destination address associated with a portion of the network flow information,
    wherein the protected device is classified to the at least one protection group using the at least one model and machine learning and as a function of the network statistics that correspond to the portion of the network flow information, and
    wherein the portion of the network flow information is associated with devices that were not previously assigned to the plurality of protection groups; and
  output results of the classification of the protected device to the at least one protection group together with identification and/or parameters of the at least one model used for the classification, wherein the parameters of the respective at least one model include the test score assigned to the corresponding ML model.

12. The system of claim 11, wherein the wherein the parameters of the respective at least one model further include a description of the type of model used for the corresponding ML model and/or settings that were used for performing the classification.

13. The system of claim 11, wherein the protection group to which the protected device is classified includes several protection groups and wherein the at least one processing device, upon execution of the plurality of programmable instructions is further configured to:
  determine a probability score for each protection group of the several protection groups, wherein the probability score is a function of at least one of a number of models of the least one model used for the classification, the parameters of the at least one model used for the classification, and a number of times the protected device was classified or assigned to the protection group; and
  output results of the classification of the protected device to each of the several protection groups together with the probability score determined for each protection group of the several protection groups.

14. The system of claim 13, wherein the network flow information further includes test network flow information having corresponding destination addresses of protection devices that were previously classified to a protection group and one of the classifications was verified for each of the protection devices by assigning the protection group to the protection group, wherein the at least one processing device, upon execution of the plurality of programmable instructions is further configured to:
  test the at least one model, including compare the protection group to which the protected device was classified with the protection group to which the protected device was previously assigned; and
  associate the test score with the respective at least one model as a function of performance of the model as indicated by comparison.

15. The system of claim 11, wherein the at least one processing device, upon execution of the plurality of programmable instructions is further configured to ignore network flow information having corresponding destination addresses of protection devices that were previously classified to a protection group and the classifications were verified.

16. The system of claim 11, wherein the at least one processing device, upon execution of the plurality of programmable instructions is further configured to access the intercepted packets or aggregated network flows that were aggregated from the intercepted packets, and form network flow information from the aggregated network flow, wherein a network flow is a series of bounded communications between a source address and a destination address associated with one of the protected devices.

17. The system of claim 11, wherein the at least one processing device, upon execution of the plurality of programmable instructions is further configured to train the at least one model using machine learning and the training data set, including training the at least one model to classify the protected devices having addresses that correspond to the destination addresses associated with the training data set to the respective protection groups of the plurality of protection groups as a function of the network statistics that correspond to the training data set.

18. The system of claim 11, wherein the at least one processing device, upon execution of the plurality of programmable instructions is further configured to:
  receive user feedback regarding one of the at least one protection group to which one of the protected devices was classified; and
  assign the protected device to the protection group based on the user feedback.

19. The system of claim 18, wherein the at least one processing device, upon execution of the plurality of programmable instructions is further configured to prompt a user for the user feedback.

20. The system of claim 11, wherein the at least one processing device, upon execution of the plurality of programmable instructions is further configured to determine augmented data for the protected device, the augmented data including at least one of a traceroute tree, hop numbers to the destination address, and ping latency, wherein the network flow information used for the classification of the protected device further includes the augmented data.

\* \* \* \* \*